March 20, 1934. C. A. SELIMOS 1,951,632
DRAIN CONTROLS FOR SEWERS AND THE LIKE
Filed Aug. 22, 1931
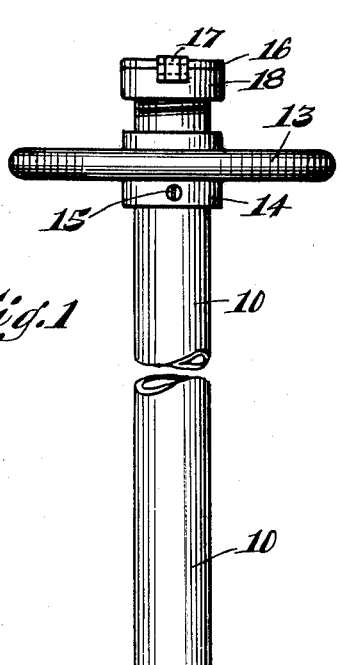
Fig.1
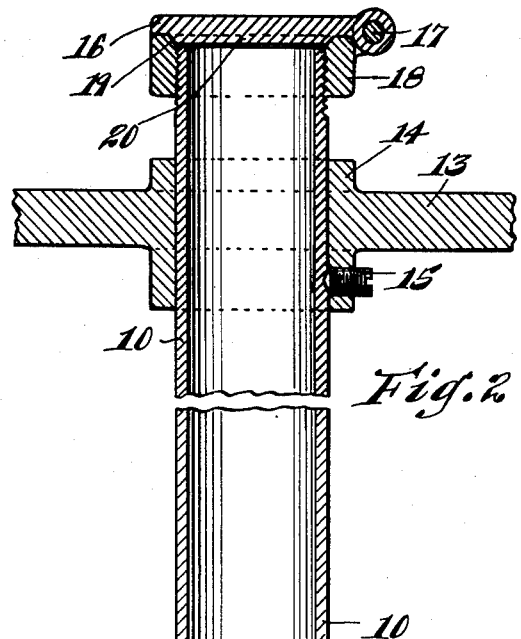
Fig.2
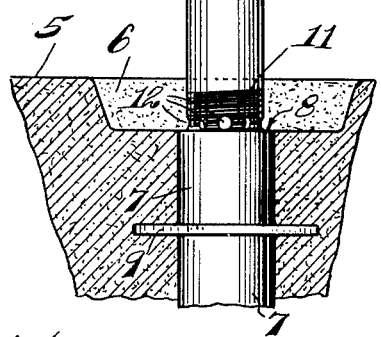
Fig.3
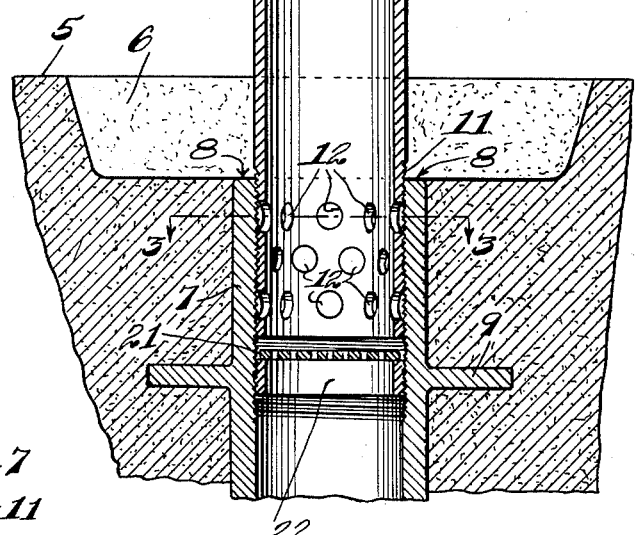
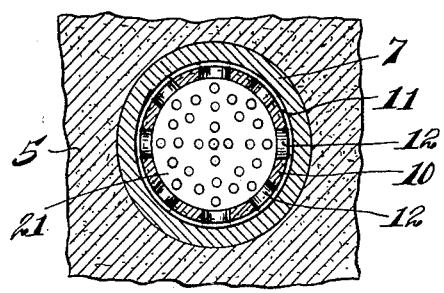
Witnesses:
C. E. Wessels
F. C. Appleton
Inventor:
Christ A. Selimos,
By Joshua R H Potte
his Attorney.

Patented Mar. 20, 1934

1,951,632

UNITED STATES PATENT OFFICE 1,951,632

DRAIN CONTROLS FOR SEWERS AND THE LIKE

Christ A. Selimos, Cicero, Ill.

Application August 22, 1931, Serial No. 558,686

1 Claim. (Cl. 137—78)

This invention relates to drain controls for sewers and the like, and has for its object to produce a simple, practical and efficient device for preventing back flow of water into basements, cellars, and other places liable to become flooded by the back pressure in sewer connections and other outlets, and at the same time permit free drainage under normal conditions.

The invention consists in the novel construction, and combination and arrangement of parts as hereinafter specified and pointed out with particularity in the appended claims. In the accompanying drawing, illustrating a practical adaptation of the invention,—

Fig. 1 is a view of the drain controlling device in side elevation and showing it adjusted for drainage;

Fig. 2 is a view, in vertical section and on an enlarged scale, showing the device in closed condition; and Fig. 3 is a cross-section taken substantially on the line 3—3 of Fig. 2.

Referring now to the drawing, the numeral 5 designates the floor or other surface to be drained, the said surface, as shown, being provided with a depression 6 constituting a catch-basin, cesspool, or the like, in which the drainage water is received just prior to entering the outlet connection to the sewer.

Embedded in the floor or under the surface to be drained is an internally screw-threaded tubular fixture or pipe fitting 7 whose upper end portion 8 is flush with the bottom of the catch-basin, cesspool or lowermost portion of the surface to be drained, said element 7 being secured in place by any approved means, but, as shown, usually embedded in the concrete floor structure or a body of concrete especially provided therefor in other floor structures and the like. As shown, the element 7 is provided with an external flange 9 which may be either polygonal or circular, as may be desired, in order to afford a most secure anchorage.

A standpipe 10 having its lower end portion screw-threaded, as at 11, is fitted into the upper portion of the fixture element 7, said end portion of the standpipe being provided with a multiplicity of apertures 12, said apertures being either open or closed accordingly as the standpipe is raised or lowered in the fixture element 7. To facilitate turning the standpipe 10 to effect its adjustment in the fixture element 7, it is preferably provided with a hand-wheel 13 or other suitable handle, affording the proper leverage, and which may be conveniently grasped by the operator. As shown, the hand-wheel 13 has its hub portion 14 sleeved on the pipe 10 and secured in place by set-screw 15, by which provision the hand-wheel may be adjusted to any desired position on the pipe.

Normally, when the drain is not in use, the threaded lower end portion 11 of the standpipe 10 is turned and moved into the fixture element 7 so as to close the entire series of apertures 12, in which condition of the device, should there be any back water in the sewer connection, it is prevented from overflowing on the floor or surface where the drain is provided, and will merely rise in the standpipe to approximately the same level it would reach if permitted to overflow on the floor.

To prevent escape of sewer gas in the event of the evaporation of the water in the sewer trap, which often occurs due to infrequent use of the drain, the standpipe 10 is provided at its upper end with a closure, preferably in the form of a lid 16 which is hinged, as at 17, to a collar 18 which may have a screw-threaded or other means of attachment to the pipe. As shown, the collar 18 has a flared annular mouth portion 19 and the underside of the lid is provided with a counterpart beveled embossment 20 which fits snugly upon but is readily releasable from said portion 19 of the collar 18. This pivoted closure element 16 is of sufficient weight to gravitate readily to its seat and to prevent the escape of gas, yet will readily lift under the accumulated air pressure above the column of water rising in the standpipe and thereby act as a relief valve to prevent bursting of the pipe connections which might otherwise occur due to the confined pressure of the back water.

By providing the plurality of apertures 12 in the lower end portion of the standpipe 10 in several horizontal rows, the pipe may be raised to different elevations so as to expose a greater or lesser number of apertures above the upper end portion 8 of the fixture element 7 according to the volume of water to be drained from the floor or surface where the device is provided. The apertures 12 serve as strainers to prevent entrance of débris or other matter into the pipe which might clog the sewer connections. So, too, a supplemental strainer plate or disk 21 may be removably placed upon an internal supporting ring 22 which, as shown, may be externally screw-threaded to engage the internal screw-threads of the fixture element 7. By this arrangement the ring support 22 may be adjusted vertically in the fixture element and, in addition to affording a support for the strainer plate or disk 21, serves as a stop for the lower end of the standpipe 10 so that when the latter is screwed thereagainst, there is a leakproof tightening of the engaging screw-threads of the fixture element 7, standpipe 10, and ring support 22. Obviously, while the leakproof connection between the fixture element 7 and standpipe 10 is thus effected, the pipe is readily turned and raised so as to uncover the apertures 12, and said standpipe may be entirely removed, at will, should occasion require.

While the herein described structure embodies a practical adaptation of the invention, it is to be understood that many changes and modifications may be made and substituted without in the least departing from the spirit or scope of the invention as defined by the appended claims.

Having thus described my invention, what I claim as new and desire to secure by Letters Patent is:

A floor drain or the like, comprising an internally screw-threaded tubular drain outlet fixture formed for anchorage in a floor with its upper end flush with the adjacent floor surface, and with its axis extending vertically, a stop-shoulder provided within said fixture at a substantial distance below its upper end, and a standpipe threaded externally for a substantial distance from its lower end for engagement with the threads of the outlet fixture, whereby said standpipe may be secured firmly in upright position, and said threaded connection constitutes the sole anchorage for the standpipe, said threaded portion of the standpipe being formed with a plurality of apertures which are covered by the threaded part of the outlet fixture at one limit of adjustment of the parts, and said standpipe, by virtue of the threaded engagement, being adjustable at will for uncovering said apertures to drain the floor through the outlet.

CHRIST A. SELIMOS.